United States Patent [19]

Culbertson et al.

[11] Patent Number: 5,168,481
[45] Date of Patent: Dec. 1, 1992

[54] AUTOMATED DIGITAL BROADCAST SYSTEM

[76] Inventors: Charles R. Culbertson, 11513 Wiginton Dr., Austin, Tex. 78758; Arthur C. Holly, 6902 Bayridge Ter., Austin, Tex. 78759; David L. Ham, 20565 Little Rock Way, Malibu, Calif. 90265

[21] Appl. No.: 458,947

[22] Filed: Dec. 29, 1989

[51] Int. Cl.⁵ ............... H04B 1/20; G11B 17/22
[52] U.S. Cl. ............................ 369/2; 369/6; 369/30; 369/33
[58] Field of Search ............ 369/2, 3, 4, 6, 35, 369/33, 34, 36, 30, 32; 360/12; 455/3; 381/1, 80, 81, 85, 123

[56] References Cited

U.S. PATENT DOCUMENTS

| | | | |
|---|---|---|---|
| 3,896,490 | 7/1975 | Rose et al. | 360/27 |
| 4,636,880 | 1/1987 | Debell | 360/12 |
| 4,706,233 | 11/1987 | d'Alayer de Costemore d'Arc | 369/36 |
| 4,766,581 | 8/1988 | Korn et al. | 369/34 |
| 4,792,934 | 12/1988 | Masaki | 369/36 |
| 4,817,075 | 3/1989 | Kikuchi et al. | 369/33 |
| 4,899,326 | 2/1990 | Takega et al. | 369/36 |
| 4,969,135 | 11/1990 | Tobe | 369/2 |

OTHER PUBLICATIONS

NCD-600 Programmable Compact Digital Disc Changer PTO received Oct. 24, 1986.
Technics "SL-P16" Multi Compact Disc Player PTO Received Oct. 24, 1986.

*Primary Examiner*—Stuart S. Levy
*Assistant Examiner*—Tan Nguyen
*Attorney, Agent, or Firm*—Pravel, Gambrell, Hewitt, Kimball & Krieger

[57] ABSTRACT

An automated digital broadcast system which is capable of reliable operation for long periods of time without human assistance. The system comprises a plurality of compact disc players or other audio devices which are controlled by computer to sequentially play a predetermined list of musical selections and commercial or informational messages.

2 Claims, 10 Drawing Sheets

AUTOMATED DIGITAL BROADCAST SYSTEM

FIELD OF THE INVENTION

The present invention relates generally to radio broadcast systems. More specifically, the present invention provides an automated digital broadcast system which is capable of reliable, unattended operation over very long periods of time.

BACKGROUND

Radio broadcast stations are typically manned by human operators who control a plurality of audio system devices for playing music selections and prerecorded commercials and announcements. The various music selections and prerecorded materials have known durations or runtimes which can be used to compile a scheduled playlist. One of the tasks of the human operator is to start and stop the various selections so that the predetermined schedule is maintained. Another task of the operator is to monitor the operation of the audio playback devices and take appropriate action if one of the devices fails to properly cue or play a given selection.

There are a number of applications where it would be desirable to have an automated broadcast system capable of playing music and other prerecorded materials over extended periods of time without human assistance. Such a system must perform the same tasks that were described above; it must start and stop the various selections in a timely manner to maintain a predetermined schedule, and it must operate reliably, monitoring the operation of the audio playback devices and taking appropriate action if a device fails to cue or play a given selection.

The prior art has heretofore lacked an automated broadcast system capable of operating reliably over long periods of time without human assistance. The automated digital broadcast system of the present invention, described in greater detail below, provides a system which meets this need.

SUMMARY OF THE INVENTION

The present invention overcomes the shortcomings of the prior art by providing an automated digital broadcast system which is capable of reliable operation for long periods of time without human assistance. The system comprises a plurality of compact disc players or other audio devices which are controlled by computer to sequentially play a predetermined list of musical selections and commercial or informational messages.

The system executes control software to perform the following functions. It reads from a data storage device into memory a compiled playlist of selections for a given period of time, such as 24 hours. It sends control signals, using appropriate interface hardware, to the audio playback devices to start and stop play of selections according to the playlist schedule. The selections are cued prior to play so that their starting time can be accurately controlled. It receives signals from the audio playback devices and monitors their operation. In the event of failure to cue, start or stop a selection on schedule, the control software causes corrective action to occur. For example, if a compact disc player does not acknowledge receipt of a command to start play, the commands to start play are reissued. Messages describing errors in system operation are recorded to file so that the operator can determine if maintenance is required. For example, faulty compact discs can be identified for replacement.

The control software maintains the playlist schedule by monitoring the runtime of each selection, and comparing actual runtime to scheduled runtime. If there is a difference in the two times, the time gap between selections is adjusted to compensate for the deviation. At the conclusion of the playlist, the control software causes the playlist for the next 24 hour period to be read into memory, and procedures are repeated to play the selections on that playlist. This process repeats itself indefinitely for the playlists stored in the system mass storage device.

An audio switching device, under software control, routes the output of the audio playback device that is playing the current selection to the system audio output.

DETAILED DESCRIPTION OF THE PREFERRED EMBODIMENT

Figure 1:
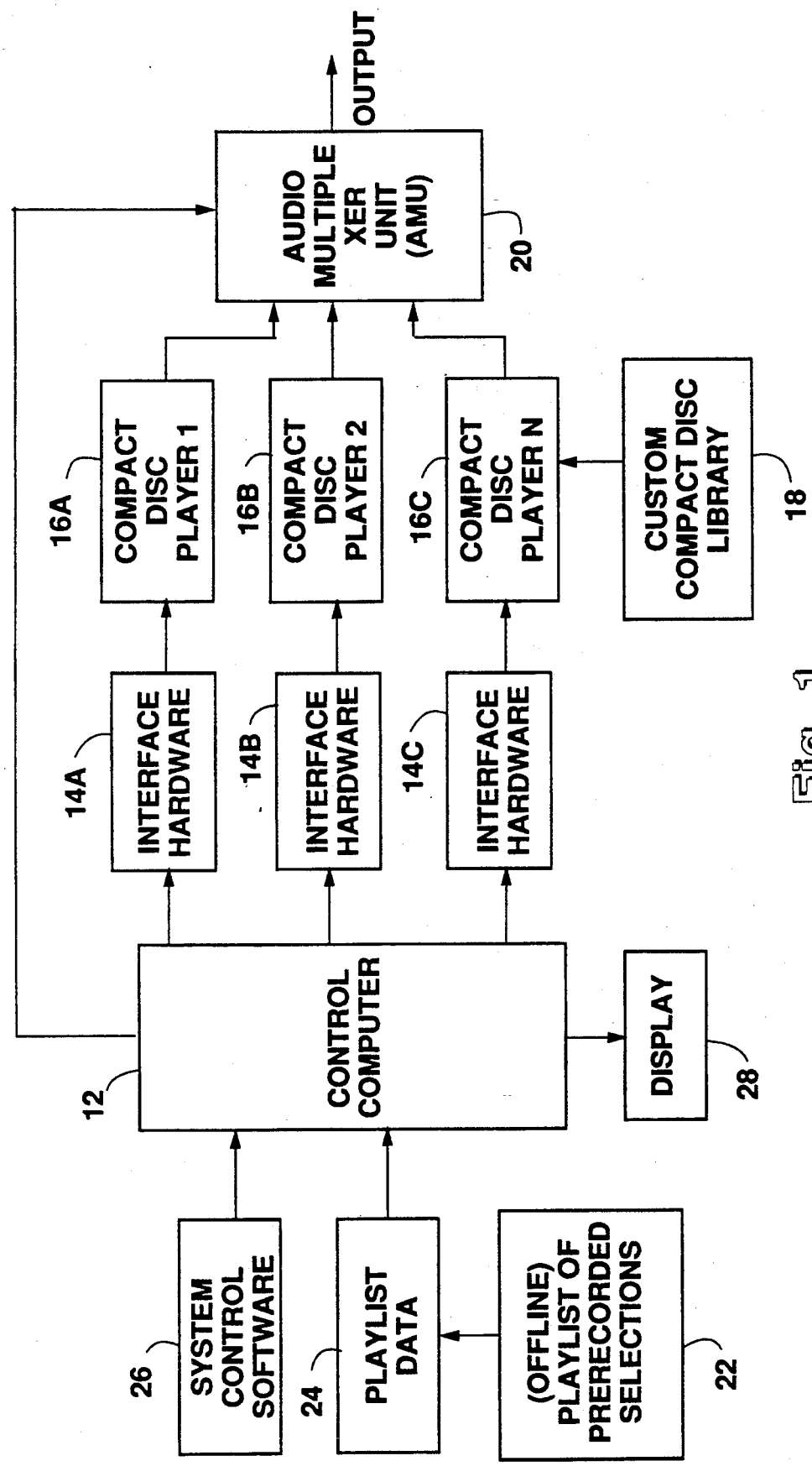
FIG. 1 is a system block diagram of the automated digital broadcast system of the present invention.

Referring to FIG. 1, schematic block diagram is shown of the automated digital broadcast system of the present invention. Operation of the system is controlled by a control computer 12 which provides control signals to interface hardware modules 14a-14c to control operation of compact disc players 16a-16c. Selections to be played on the compact disc players 16a-16c are contained in a custom compact disc library 18. The sequence of music and commercial selections to be played from the compact disc library is determined by a playlist of music selections and commercial/information messages ("infomercials"). The playlist can be compiled using a program, such as the "SELECTOR" program produced by RCS Inc., to produce a sequential list containing information relating to the songs, artists, disc and track numbers, and times of play for the various selections. The compiled playlist 22 is stored in an appropriate playlist data storage device 24 for subsequent access by the control computer 12. Operation of the system is controlled by system control software 26 which is stored in an appropriate memory device as shown in FIG. 1. A display device 28, which can be in the form of a high resolution color monitor, displays a portion of the information contained in the playlist to allow an operator to obtain information about the music or commercial selection currently being played as well as those selections that will be played subsequently. An audio multiplexer unit (AMU) 20 routes the output of the compact disc player that is playing the current selection to the system audio output.

FIGS. 2a-2i provide a flowchart description of the functional features of the system control software. Before discussing details relating to the flowcharts, however, the main features of the control software will be briefly summarized. The control software reads a "playlist" file which contains the sequence of selections to be played for a defined 24 hour period. At the end of the 24 hour period, the next file is read and play begins again. Although the system will be described in terms of a 24 hour play period, the maximum "walkaway" or unattended time is limited by mass storage capacity of the computer. Typically, 32 kilobytes is required to store one day's playlist. Therefore, one megabyte would be required for one month (31 days) of play time. In general, the system is utilized with one week of walkaway time to allow for new program material to be added each week. In operation, the control software periodically writes a "status file" indicating the selection number and day number so the system can return to the proper place in the playlist if the system is disabled because of loss of power.

The control software automatically controls the play selection of a compact disc library by executing the following functions: First, the control software sends commands to the compact disc players to do one of the following: (a) cue a specified disc; (b) start playing a cued disc at a specified track; or (c) stop play at the end of track (EOT) and return the disc to the tray. The software receives and processes signals from the compact disc players which indicate that one of the following events has occurred: (a) a disc has been set into place and is ready for play, (b) the table of contents (TOC) of a specified disc has been read, (c) an EOT has been encountered, or (d) a specified track of a disc is playing. The software maintains the scheduled play by comparing actual runtime to scheduled runtime for each selection. The cumulative time difference between actual and scheduled time is computed, and the time gap between songs is adjusted to correct the cumulative difference. For normal operation, the error between scheduled and actual program time during a 24 hour period is maintained to within plus or minus 5 seconds.

The control software constantly displays the system status. For example, the software displays appropriate messages to indicate the detection of EOT has occurred, or that a disc has been set into place and is ready to play. In addition, the system software constantly displays a playlist for some of the selections which have already been played and also displays the playlist for the current selection and future selections. The playlist contains information relating to the artist, title and runtime for the next selection, in addition to the disc number and track number for that selection.

Referring to FIGS. 2a-2i, the flowchart for the control system software will now be discussed. In step 100 the software is started and in step 110 an opening screen is displayed. In steps 120 through 135, the user is promoted to check displayed information to see if the date, time, and playlist files are correct, and to take corrective action as needed. Then, in step 140, status files are read to determine the day and selection number for start of play. The status files can be modified off-line by the operator so that the machine can be started at a desired day and song. Otherwise, the status file will contain the day and number corresponding to the selection last played. In step 150, the windows are initialized for displaying playlist and system status information, and in step 160 the interface hardware (programmable input-/output cards) is initialized so that the control computer and the compact disc players can communicate. It may be noted that step 150 constitutes the beginning of the "day loop"; i.e., when the program concludes play for a given 24 hour period, it will return to step 150 to begin play for a new day (see FIG. 2f).

Steps 170 through 190 complete the initialization procedures. In step 170, the playlist for the next 24 hour period is read into memory and the beginning entries of the playlist are displayed. The file to which errors are written is initialized in step 180, and the software for handling interrupts from the compact disc player is installed in memory in step 190. The interrupt handler allows the control computer to temporarily suspend program execution upon a signal from the compact disc player so that data signals from the disc player can be received.

In step 200, the compact disc players are cued to the first three selections on the playlist. In the following discussion, a set of 3 compact disc players is used. It is to be understood, however, that the features described hereinbelow can be accomplished with fewer or more compact disc players and without necessarily running them in the given sequential order. In addition, the features described can be accomplished with any digitally controlled audio playback device, such as a digital audio tape player rather than a compact disc player, although the details of the commands sent to and the signals received from the audio playback device would change.

Commands are issued in step 210 to start play of the first selection. At approximately the same time, in step 220, a clock is started in software to measure the runtime of the selection. In step 230, a check is made to verify that the compact disc player has sent a signal to acknowledge receipt of the commands to start playing the cued selection. If there is no such verification, the commands are reissued until their receipt is acknowledged. If three such attempts are made and fail to start play, an error message is displayed and written to file, and the program proceeds to the next step under the assumption that the selection has started play but that the compact disc player failed to acknowledge the commands. (The validity of this assumption will be tested below.)

Step 240 is a call to the subroutine MONITOR DISC PLAYER. This subroutine, diagrammed in FIG. 2g, serves three main functions: (1) it monitors the compact disc player to determine if the runtime of the selection has exceeded a preset limit, (2) it determines whether or not a selection is playing, and (3) it detects the end of track for the selection being played. These determinations are made in steps 520, 530, and 540, respectively. If the runtime has exceeded its limit (for example, 7 mintues, which exceeds the longest song in the library) then an error message is written to the error log file and the end of track (EOT) flag is set to TRUE in step 525. Similarly, if the compact disc player does not send data to the control computer indicating that a disc is playing, an error is logged to file and displayed, and the EOT flag is set in step 535. If either of these errors occur, or if the end of track for the current selection is reached, the subroutine will, in step 550, disable the interrupt and, in step 560, return to the main program. As long as a selection is playing without error, the subroutine continues to loop through step 545.

Upon return from subroutine MONITOR DISC PLAYER, the first selection is stopped in step 250. At approximately the same time, the runtime clock in software is stopped, and it is determined in step 260 whether or not the actual runtime of the selection was less than the scheduled runtime. If the actual runtime is less than the scheduled runtime, then a delay is introduced, the time of which depends upon the difference between scheduled and actual runtimes. The scheduled runtime is preset to exceed the actual runtime by about 1 second, so, unless the system is behind schedule, some delay will always be introduced. In this way, the time gap between selections is adjusted to maintain the playlist schedule.

At the time that is appropriate to maintain schedule, commands are issued in step 270 to start playing the second selection on the playlist. As was done for the first selection, a runtime clock is started in step 280 to monitor time of play, and a check is made in step 290 to determine if the compact disc player received the commands to start play. If there is no acknowledgement that the commands were received, then, in step 295, the commands are reissued up to 3 times and appropriate error messages are written to the error log file and displayed to the operator.

Once the commands to start play are acknowledged, or have been sent three times, program control passes to step 300, where the number of the currently playing selection and the current day number are written to the status files. The next step in the control sequence, step 320, is the beginning of the main loop of the program. The main program loop will continue to alternatively cue and play songs, returning control to steps 310 and 320, until the next-to-last selection of the 24 hour period is played. (See step 420 for the end of this loop.)

Because the system is configured with three compact disc players, the next-to-last and last selections require special treatment; no cueing of a later selection in the playlist is required during play of either of these selections. The first step (step 320) in the main loop therefore determines if more than 2 selections remain to be played. If not, control is passed to step 410, where further steps are taken to play the last two selections. If more than 2 selections remain, commands are issued in step 330 to cue the next selection.

The procedures used in cueing a selection on a compact disc player must take into account the scheduled runtime of the currently playing selection. Specifically, the cueing process must be completed before the end of track of the currently playing selection is encountered, or the currently playing song will not be stopped at its end. Step 340 determines if the selection currently playing has a short runtime or a relatively long runtime by checking the playlist data record. If the selection is shorter than 35 seconds, then the quickest possible cueing procedure is used by passing control to step 350. If the selection currently playing has a runtime greater than 35 seconds, then a longer but more robust cueing procedure is taken in step 345, in which the subroutine MONITOR SONG CUE is called.

Figure 2A:
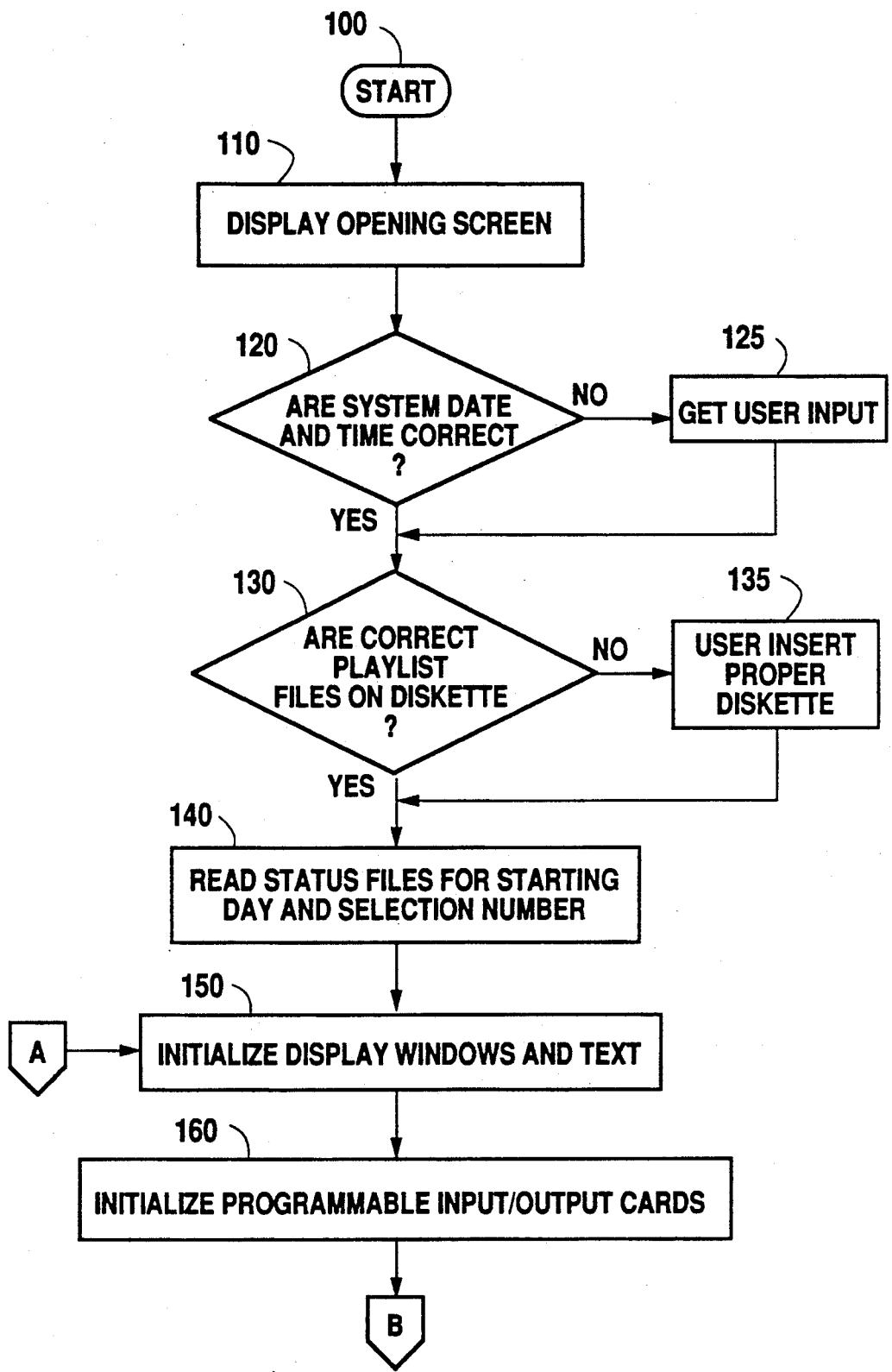
FIGS. 2a through 2i are flowchart illustrations of the processing steps implemented by the system control software used in the automated digital broadcast system of the present invention.
Figure 2B:
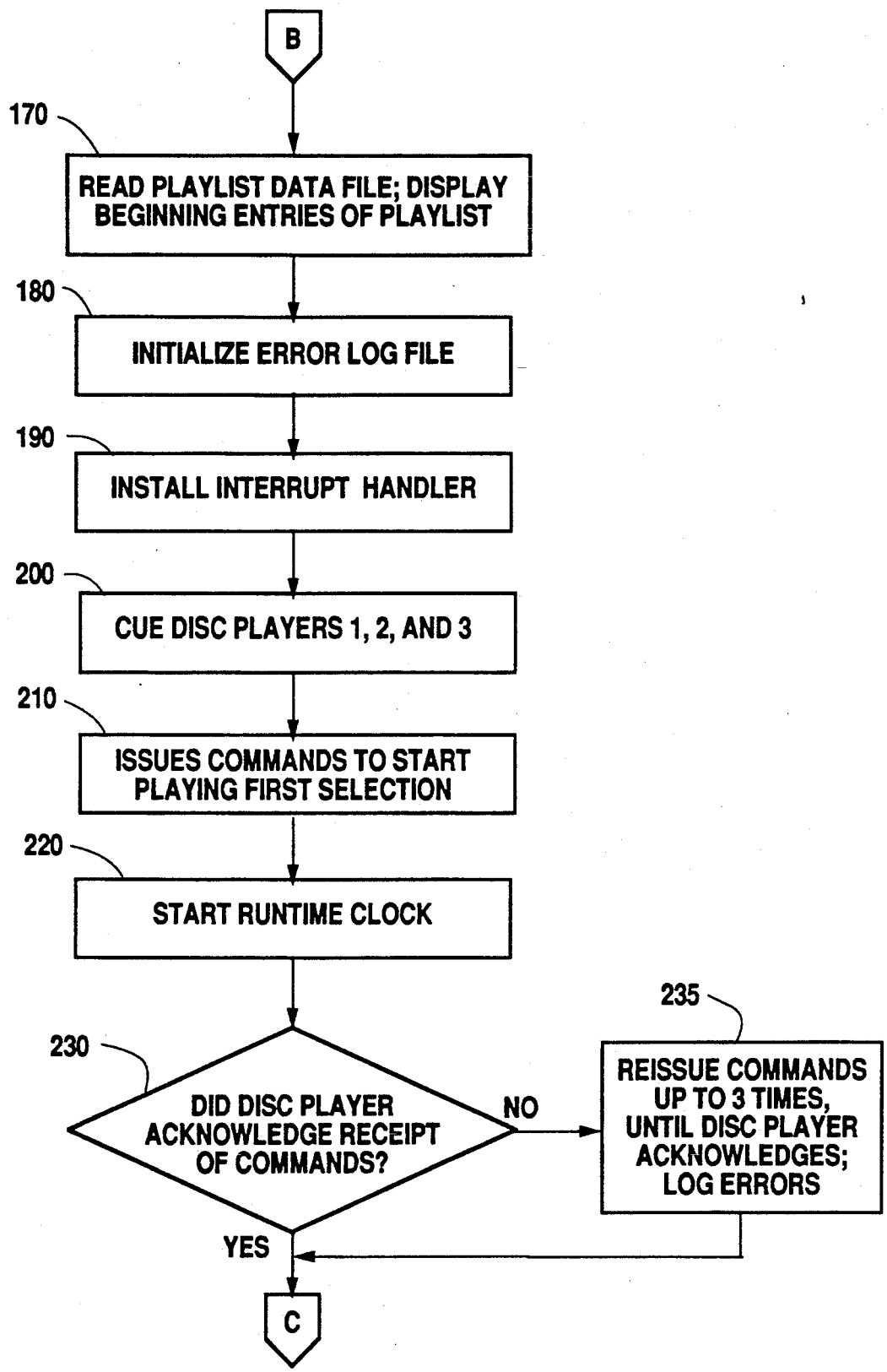
Figure 2C:
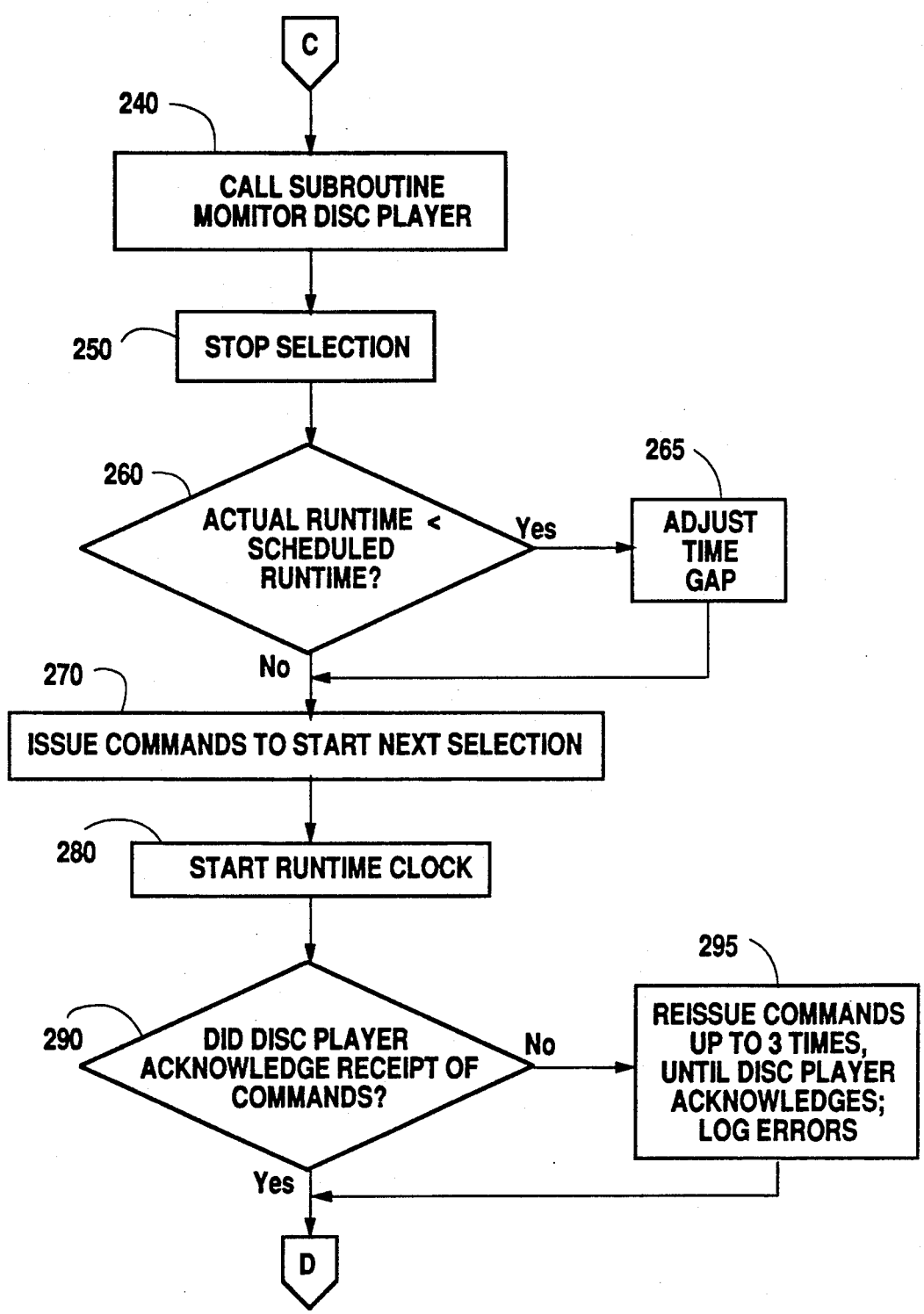
Figure 2D:
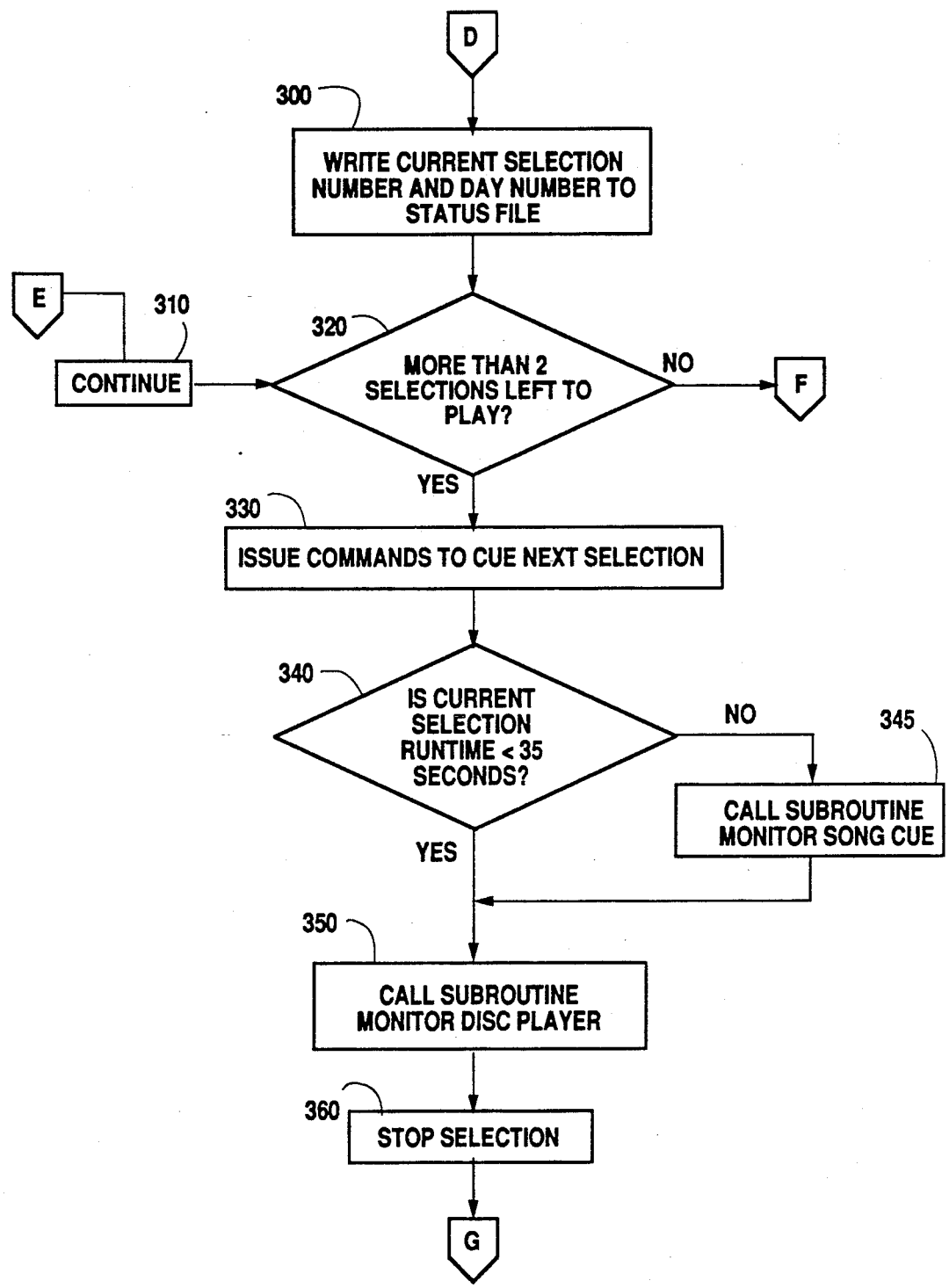
Figure 2E:
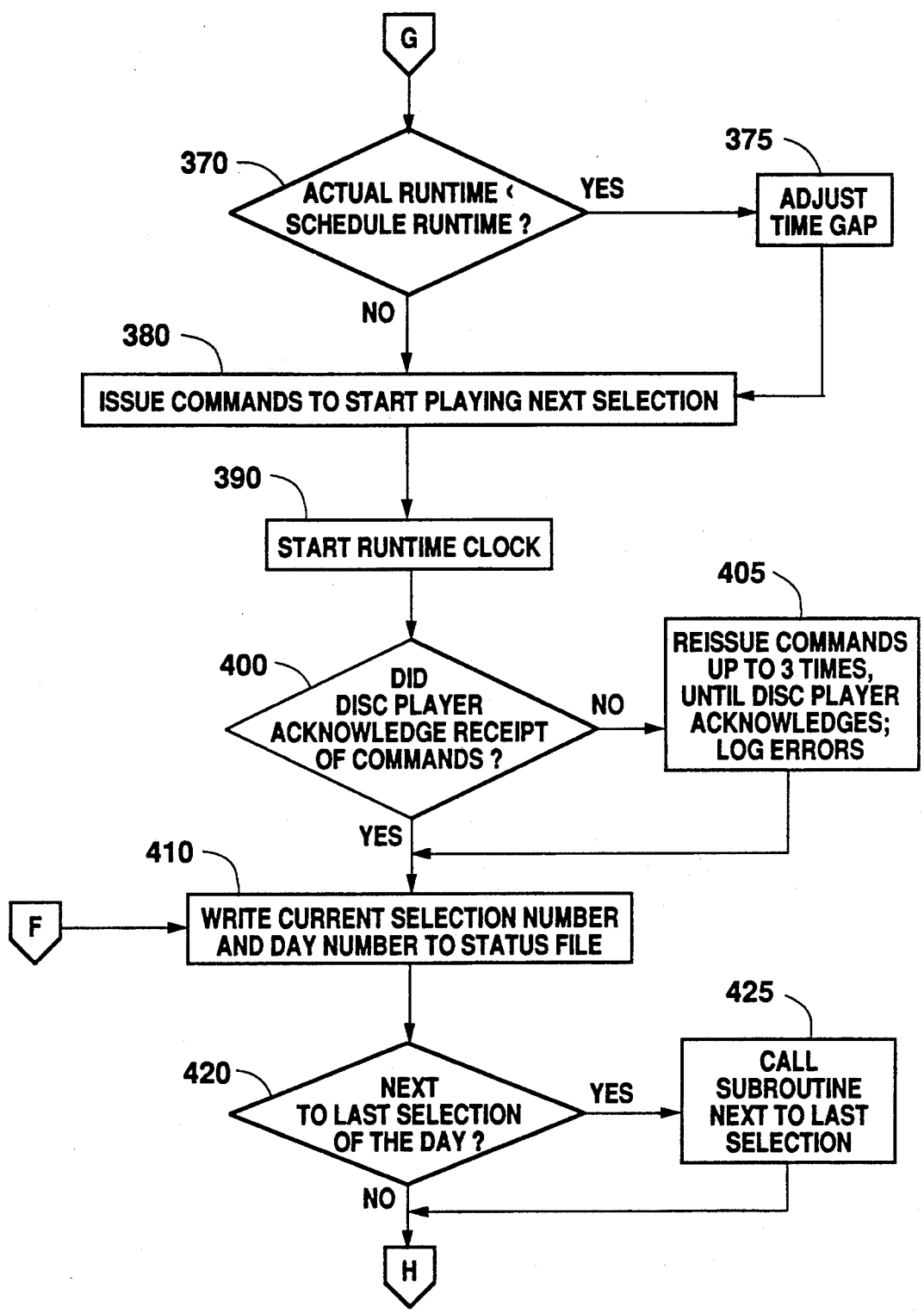
Figure 2F:
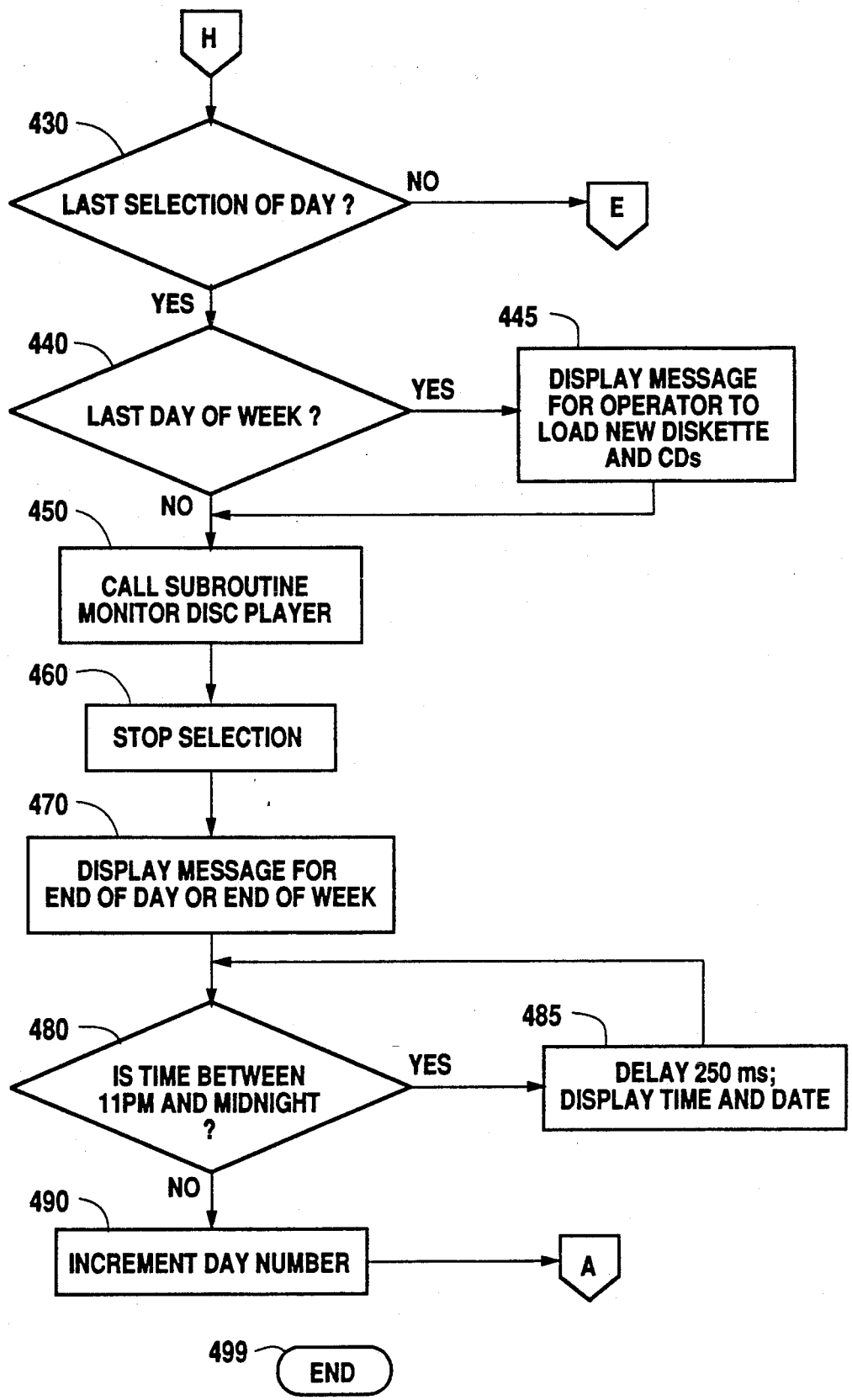
Figure 2G:
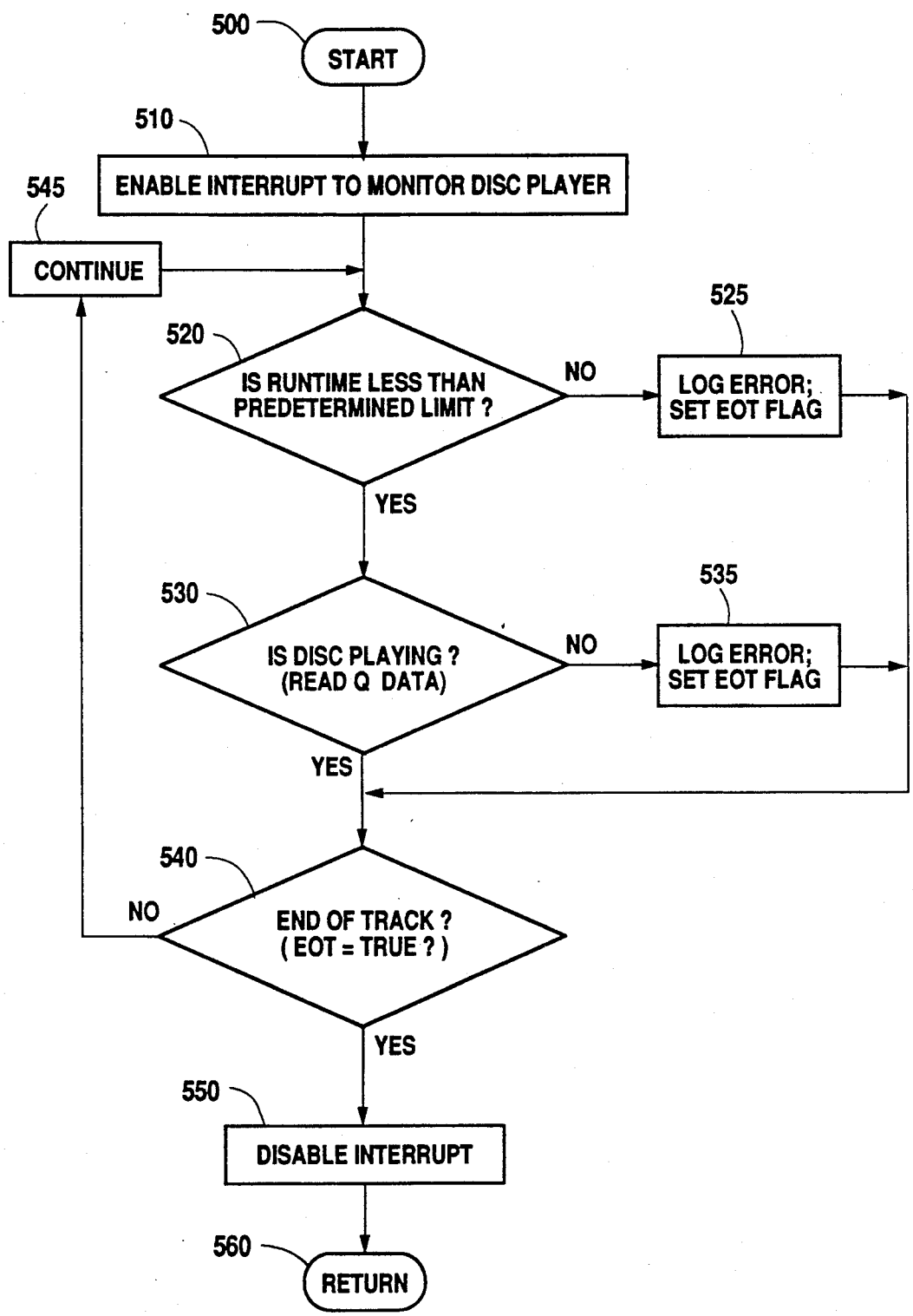
Figure 2H:
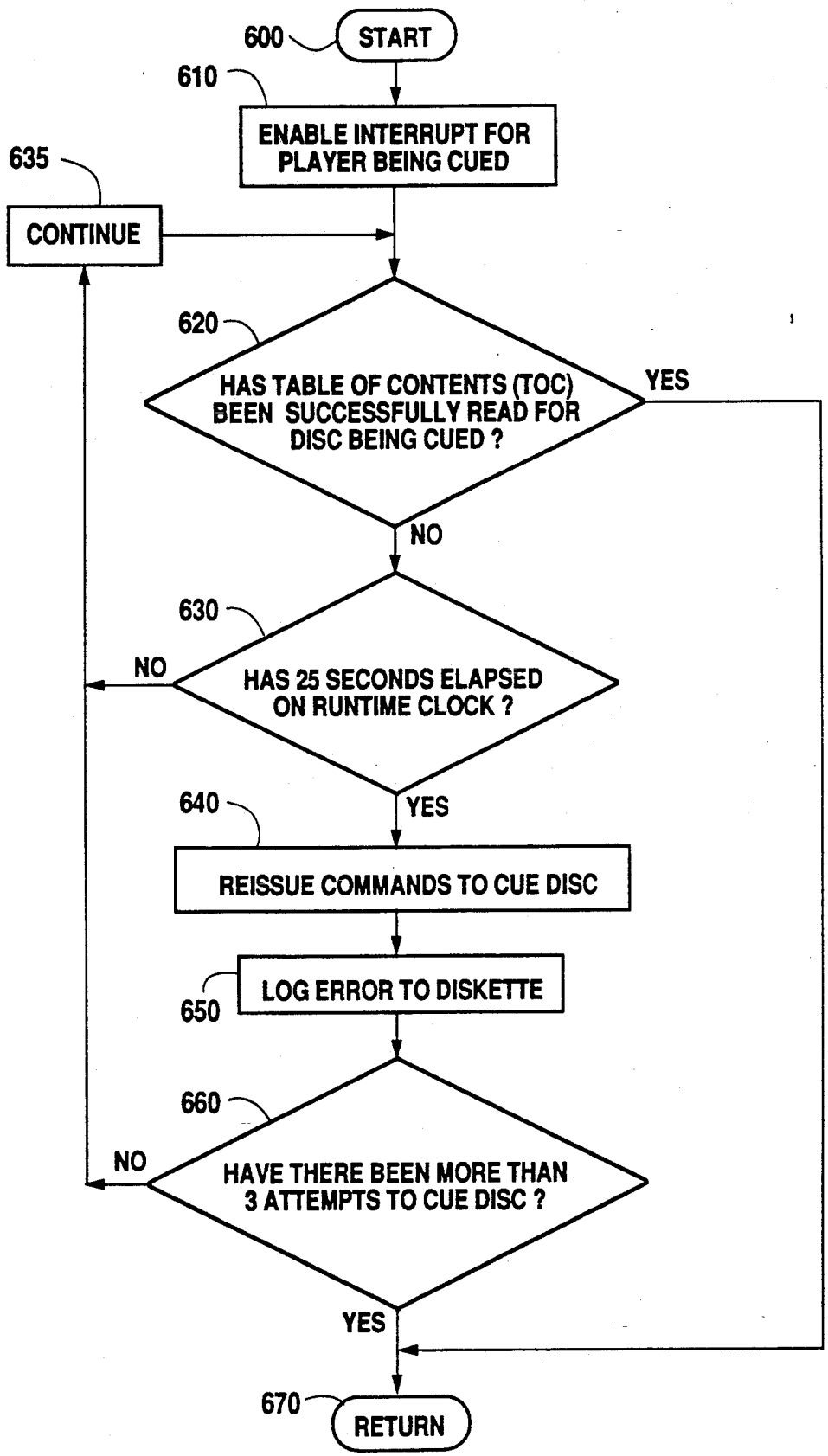
Figure 2I:
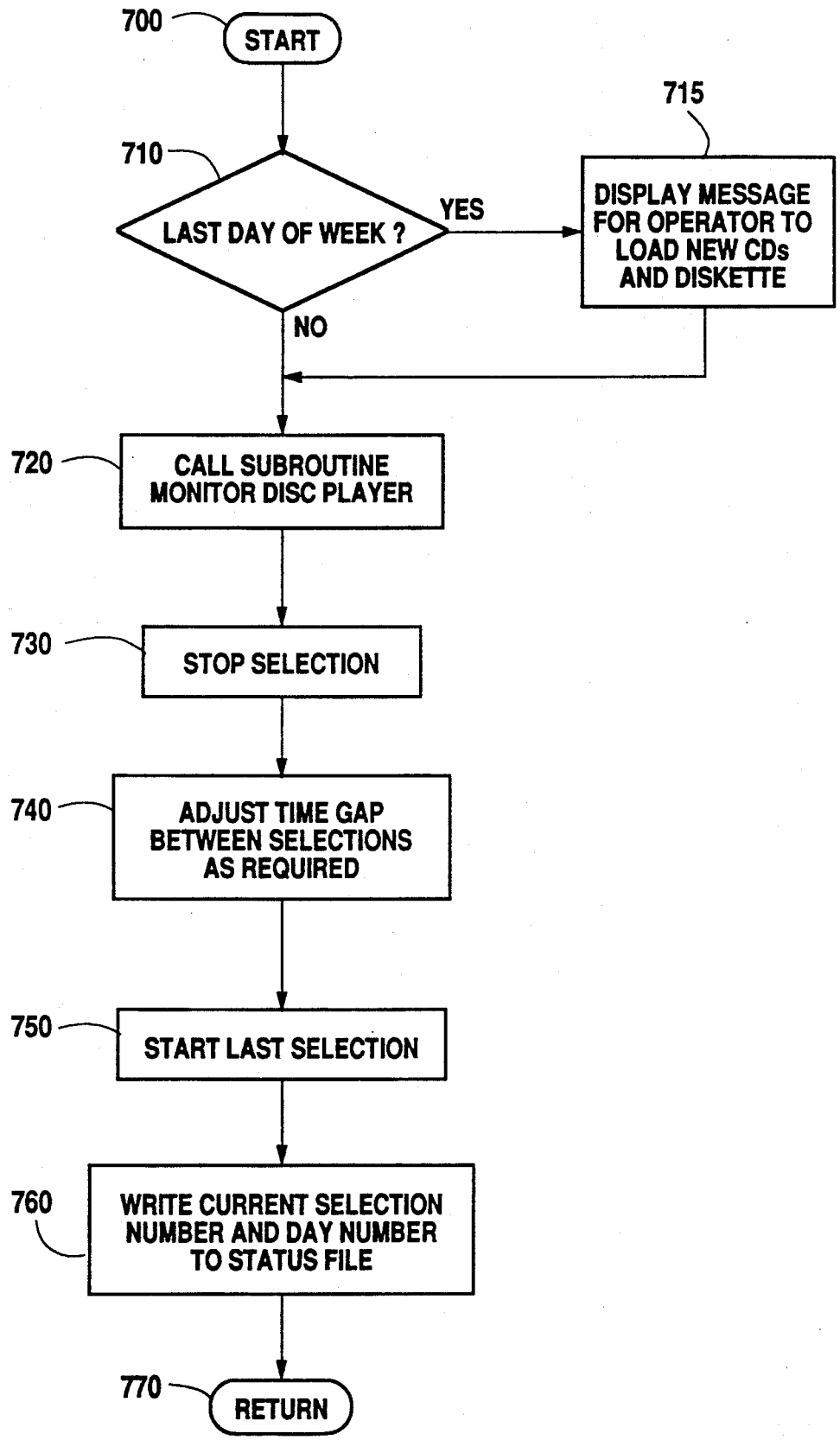

Subroutine MONITOR SONG CUE, shown in FIG. 2h, starts at step 600. In step 610, the interrupt corresponding to the compact disc player being cued is enabled so that the control computer can receive signals from that player. In step 620, a check is made that the table of contents have been successfully read for the disc being cued. If the table of contents have been read, then the disc must be loaded into the player and be ready for play. In that event control passes to step 670, and the subroutine returns to the calling program. If the table of contents have not been read, repeated efforts in steps 630, 635, and 620 are made until success is achieved or until 25 seconds has elapsed. If 25 seconds elapses without reading the table of contents, then, in step 640, commands are reissued to the compact disc player to cue the disc and, in step 650, an error message is written to the error log file. The entire process, step 620 through 650, is repeated until the table of contents is read or, in step 660, it is determined that a limit of 3 attempts have been made to cue the disc. In either case, control returns to the main program in step 670. The entire cueing process for a song can take up to 75 seconds to execute if there are failures in reading the table of contents. In practice there are very few failures in cueing, and the process for a song is typically completed in about 25 seconds.

Once commands have been issued to cue a selection, the subrouting MONITOR DISC PLAYER is called in step 350 to monitor the selection currently playing. Upon detection of the end of track or if the EOT flag has been set due to an error as described above, the selection is stopped in step 360. Following an adjustment in time between songs that is performed by steps 370 and 375, commands are issued in step 380 to start the next selection. A software clock is started in step 390 to measure actual runtime of the selection, and, in steps 400 and 405, commands to start play are reissued up to 3 times as appropriate. The status files are updated with the current selection number and day number in step 410.

It is determined in step 420 whether or not the current selection is the next to last selection of the day. If so, step 425 calls subroutine NEXT TO LAST SELECTION. This subroutine, shown in FIG. 2i, begins with step 700. If in step 710 it is determined that the current day is the last day of the week (or other period of time up to a month or more), then a message is displayed in step 715 to remind the operator to prepare to load a new set of computer discs and new playlist diskette as required. In step 720 the subroutine MONITOR DISC PLAYER is called to detect the end of track or to set the end of track flag upon detection of an appropriate error. In step 730 the next to last selection is stopped and, following an appropriate time delay as determined in step 740, the last selection is started. The status files are updated in step 760, and control returns to the main program in step 770.

For all selections in the playlist other than the last selection, step 430 marks the end of the main loop; following step 430 control returns to step 310 in FIG. 2d until all selections but one have been played. If step 430 determines that the last selection of the day is being played, then a test is made in step 440 to see if it is the last day of the week (or other preset time period). If so, a second message is displayed to remind the operator to prepare for the end of the week. In step 450, a subroutine is called to monitor the final selection until the end of track, and, in step 460, the selection is stopped. A message is displayed in step 470 to inform the operator that the end of the day, or the end of the week, if appropriate, has been reached, and that the system will resume play at midnight.

In step 480, the system clock is polled to determine if it is between 11 PM and midnight; if so, program execution is delayed until midnight. At midnight, the day number is incremented in step 490, and program control returns to the beginning of the "day loop", step 150 is FIG. 2a.

Although the automatic digital broadcast system of the present invention has been described in connection with the preferred embodiment, it is not intended to be limited to the specific form set forth herein, but on the contrary, it is intended to cover such modifications, alternatives, and equivalents as can be included within the scope and spirit of the invention as defined by the appended claims.

What is claimed is:

1. An automated digital broadcast system, comprising:
   a playlist of desired music and information selections, said playlist containing information relating to the play time of each music selection in said playlist, said playlist further comprising a plurality of time gaps, of predetermined length, between each of said selections;
   a plurality of means for playing selections contained in said playlist;
   programmable means for controlling the operation of said plurality of means for playing said selections;
   a plurality of means for monitoring the operation of said means for playing selections to detect and correct errors in cueing, starting and stopping selections;
   means for recording errors detected by said means for monitoring said players, said means for recording being operable to notify a system operator of the need for system maintenance;
   timing means for maintaining operation of said system in accordance with a time schedule to allow unattended operation of said system for long periods of time, said timing means being operable to compare the actual play time of each music selection with the corresponding anticipated play time for said selection, said timing means being operable to alter the length of said time gaps between said selections in said playlist, as needed, to maintain operation of said system in accordance with said schedule.

2. The automated digital broadcast system according to claim 1, said plurality of means for playing music selections comprising a plurality of optical disc players.

* * * * *